United States Patent [19]

Bottomley

[11] Patent Number: 5,677,930
[45] Date of Patent: Oct. 14, 1997

[54] METHOD AND APPARATUS FOR SPREAD SPECTRUM CHANNEL ESTIMATION

[75] Inventor: Gregory E. Bottomley, Cary, N.C.

[73] Assignee: Ericsson Inc., Research Triangle Park, N.C.

[21] Appl. No.: 504,339

[22] Filed: Jul. 19, 1995

[51] Int. Cl.⁶ ............................................. H04B 1/707
[52] U.S. Cl. ............................... 375/208; 375/206
[58] Field of Search .......................... 375/200, 205, 375/206, 208, 209, 210, 343, 349

[56] References Cited

U.S. PATENT DOCUMENTS

| | | | |
|---|---|---|---|
| 4,630,283 | 12/1986 | Schiff | 375/207 |
| 5,048,059 | 9/1991 | Dent | 375/340 |
| 5,224,122 | 6/1993 | Bruckert | 375/200 |
| 5,237,586 | 8/1993 | Bottomley | 370/206 |
| 5,305,349 | 4/1994 | Dent | 370/209 |
| 5,329,547 | 7/1994 | Ling | 370/342 |
| 5,345,468 | 9/1994 | Bi | 375/200 |
| 5,347,535 | 9/1994 | Karasawa et al. | 370/342 |
| 5,500,856 | 3/1996 | Nagase et al. | 375/210 |
| 5,506,861 | 4/1996 | Bottomley | 370/441 |
| 5,572,552 | 11/1996 | Dent et al. | 375/343 |

FOREIGN PATENT DOCUMENTS 641 091   3/1995   European Pat. Off. .

OTHER PUBLICATIONS

"*Optimum Multiuser Detection in Single–Path Rayleigh Fading Channels*", Zvonar et al., Presented at Twenty-Ninth Allerton Conference on Communication, Control and Computing, pp. 390–399, Oct. 1991.

"*On Multiuser Detection in Asynchronous CDMA Flat Rayleigh Fading Channels*", Zvonar et al., PIMRC, five pages, 1992.

"*A Comparison of Differentially Coherent and Coherent Multiuser Detection With Imperfect Phase Estimates in Rayleigh Fading Channel*", Zvonar et al., IT, one page, 1993.

"*Adaptive Multiuser Receiver For Fading CDMA Channels With Severe ISI*", Zvonar et al., appearing in the Proceedings of Conference on Information Sciences and Systems, six pages, Mar. 1993.

"*Joint Signal Detection and Parameter Estimation in Multiuser Communications*", Xie, IEEE Transactions on Communications, vol. 41, No. 7, pp. 1208–1216, Aug. 1993.

"*A Spread–Spectrum Multiaccess System with Cochannel Interference Cancellation for Multipath Fading Channels*", Yoon, IEEE Journal on Selected Areas in Communications, vol. 11, No. 7, pp. 1067–1075, Sep. 1993.

"*On Synchronous CDMA for Mobile Communications*", Kajiwara, IEEE Globecom., pp. 858–862, 1992.

"*Optimum Detection in Asynchronous Multiple–Access Multipath Rayleigh Fading Channels*", Zvonar et al., Twenty-Sixth Annual Conference on Info. Sciences and Systems, Princeton Univ., six pges, Mar. 1992.

"*Suboptimum Multiuser Detector for Synchronous CDMA Frequency–Selective Rayleigh Fading Channels*", Zvonar et al., five pages, CTMC, 1992.

(List continued on next page.)

Primary Examiner—Stephen Chin
Assistant Examiner—Jeffrey W. Gluck
Attorney, Agent, or Firm—Burns, Doane, Swecker & Mathis, L.L.P.

[57] ABSTRACT

Methods and systems for receiving signals in spread spectrum communications are described. In CDMA systems, for example, signature sequences used to generate correlations with received signals may not have ideal autocorrelation properties. In such cases, the correlations determined by the receiver may include errors which are propagated through channel tap estimates to the demodulated and decoded information symbols. To reduce or eliminate such self-interference or inter-ray interference, the correlations are decorrelated by, for example, matrix multiplying them with values related to values of the autocorrelation function for the signature sequence of interest.

9 Claims, 3 Drawing Sheets

OTHER PUBLICATIONS

"Coherent and Differentially Coherent Multiuser Detectors for Asynchronous CDMA Frequency-Selective Channels", Zvonar et al., *IEEE MILCOM*, pp. 0442–0446, 1992.

"Minimum Probability of Error for Asynchronous Gaussian Multiple-Access Channels", Verdu, *IEEE Transactions on Information Theory*, vol. IT–32, No. 1, pp. 85–96, Jan. 1986.

"Linear Multiuser Detectors for Synchronous Code-Division Multiple-Access Channels", Lupas et al., *IEEE Transactions on Information Theory*, vol. 35, No. 1, pp. 123–136, Jan. 1989.

"Near-Far Resistance of Multiuser Detectors in Asynchronous Channels", Lupas et al., *IEEE Transactions on Communications*, vol. 38, No. 4, pp. 496–508, Apr. 1990.

"A Near-Far Resistant Sliding Window Decorrelating Algorithm for Multi-User Detectors in DS-CDMA Systems", Wijayasuriya t al., *IEEE Globecom.*, pp. 1331–1338, 1992.

"Rake Decorrelating Receiver for DS-CDMA Mobile Radio Networks", Wijayasuriya et al., *Electronics Letters*, vol. 29, No. 4, pp. 395–396, Feb. 1993.

"Rake Decorrelation as an Alternative to Rapid Power Control in DS-CDMA Mobile Radio", Wijayasuriya et al., *IEEE*, pp. 368–371, 1993.

"A Family of Suboptimum Detectors for Coherent Multiuser Communications", Xie et al., *IEEE Journal on Selected Areas in Communications*, vol. 8, No. 4, May, 1990.

"Interference Reduction Applied to Channel Estimation in CDMA Systems", J. Thielecke et al., *IEEE*, pp. 752–756, Mar. 1994.

"New Antimultipath Technique for Spread Spectrum Receivers", R. S. Mowbray et al., *Electronic Letters*, vol. 29, No. 5, pp. 456–457, Mar. 4, 1993.

"Adaptive Maximum-Likelihood Receiver for Carrier-Modulated Data-Transmission Systems", B. Ungerboeck, *IEEE*, vol. Comm–22, No. 5, pp. 624–636, May 1974.

International Search Report re PCT/US96/11685 Date of Mailing of International Search Report: Dec. 3, 1996.

Z. Zvonar, "Multiuser Detection and Diversity Combining for Wireless CDMA Systems", *Fourth Winlab Workshop on Third Generation Wireless Information Networks*, pp. 65–89 (19–20 Oct. 1993).

S. Wijayasuriya et al., "RAKE Decorrelation as an Alternative to Rapid Power Control in DS-CDMA Mobil Radio", *43rd IEEE Vehicular Technology Conference*, pp. 368–371 (18–20 May 1993).

A. Duel-Hallen, "Decorrelating Decision-Feedback Multiuser Detector for Synchronous Code-Division Multiple-Access Channel", *IEEE Transactions on Communications*, vol. 41, No. 2, pp. 285–290 (1993).

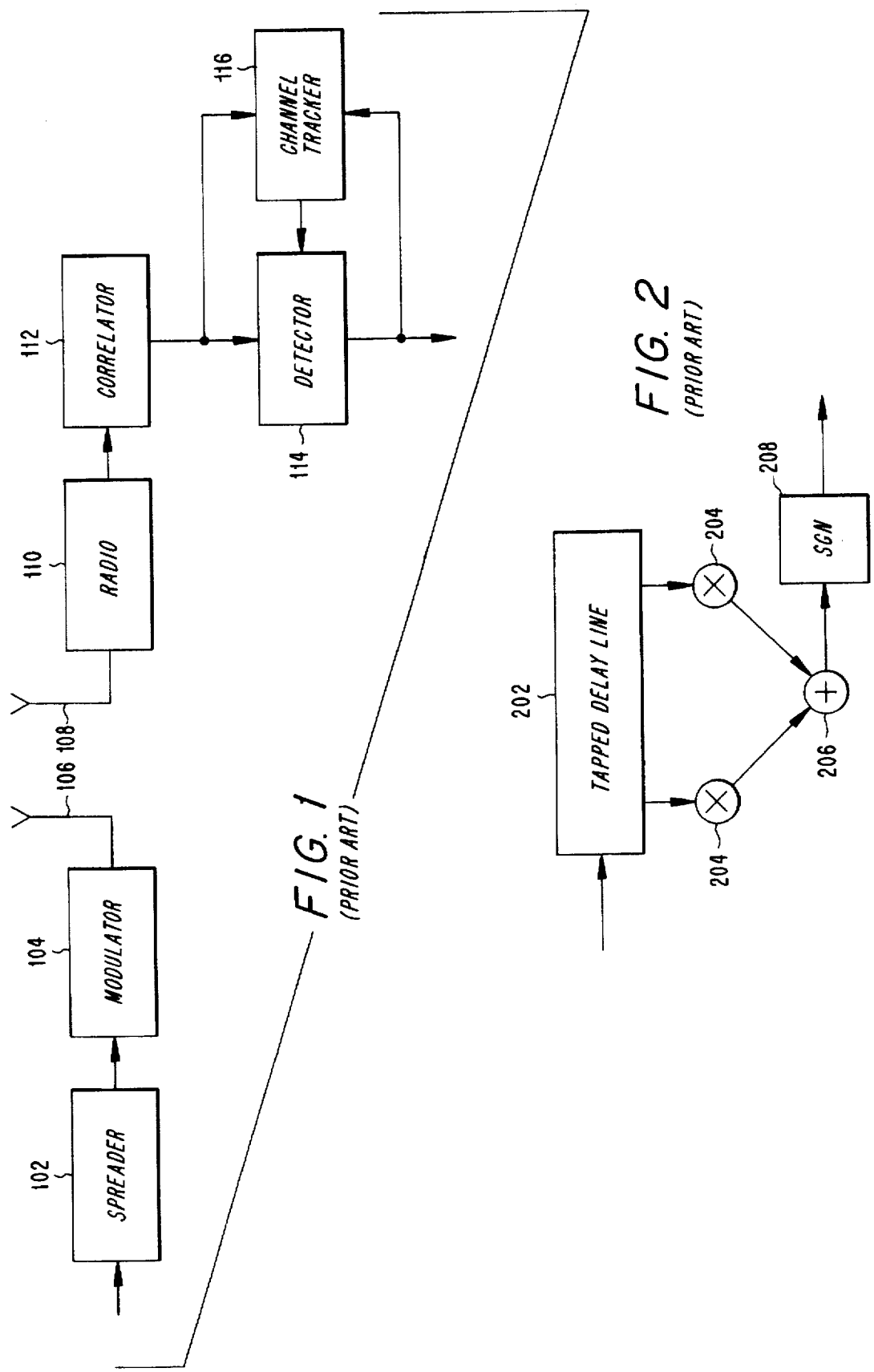

METHOD AND APPARATUS FOR SPREAD SPECTRUM CHANNEL ESTIMATION

BACKGROUND

The present invention generally relates to the use of Code Division Multiple Access (CDMA) communication techniques in radio communication systems and, more particularly, to receivers which demodulate CDMA signals using estimates of channel tap coefficients.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

Throughout the world, one important step in the advancement of radio communication systems is the change from analog to digital transmission. Equally significant is the choice of an effective digital transmission scheme for implementing the next generation technology. Furthermore, it is widely believed that the first generation of Personal Communication Networks (PCNs), employing low cost, pocket-sized, cordless telephones that can be carried comfortably and used to make or receive calls in the home, office, street, car, etc., will be provided by, for example, cellular carriers using the next generation digital cellular system infrastructure. An important feature desired in these new systems is increased traffic capacity.

Currently, channel access is achieved using Frequency Division Multiple Access (FDMA) and Time Division Multiple Access (TDMA) methods. In FDMA, a communication channel is a single radio frequency band into which a signal's transmission power is concentrated. Signals which can interfere with a communication channel include those transmitted on adjacent channels (adjacent channel interference) and those transmitted on the same channel in other cells (co-channel interference). Interference with adjacent channels is limited by the use of band pass filters which only pass signal energy within the specified frequency band. Co-channel interference is reduced to tolerable levels by restricting channel re-use by providing a minimum separation distance between cells in which the same frequency channel is used. Thus, with each channel being assigned a different frequency, system capacity is limited by the available frequencies as well as by limitations imposed by channel reuse.

In TDMA systems, a channel consists of, for example, a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, with each channel being assigned a different time slot, system capacity is limited by the available time slots as well as by limitations imposed by channel reuse as described above with respect to FDMA.

With FDMA and TDMA systems (as well as hybrid FDMA/TDMA systems), one goal of system designers is to ensure that two potentially interfering signals do not occupy the same frequency at the same time. In contrast, Code Division Multiple Access (CDMA) is a channel access technique which allows signals to overlap in both time and frequency. CDMA is a type of spread spectrum communications, which has been around since the days of World War II. Early applications were predominantly military oriented. However, today there has been an increasing interest in using spread spectrum systems in commercial applications since spread spectrum communications provides robustness against interference, which allows for multiple signals to occupy the same bandwidth at the same time. Examples of such commercial applications include digital cellular radio, land mobile radio, and indoor and outdoor personal communication networks.

In a CDMA system, each signal is transmitted using spread spectrum techniques. In principle, the informational data stream to be transmitted is impressed upon a much higher rate data stream known as a signature sequence. Typically, the signature sequence data are binary, providing a bit stream. One way to generate this signature sequence is with a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called spreading the informational data stream signal. Each informational data stream or channel is allocated a unique signature sequence.

A plurality of spread information signals modulate a radio frequency carrier, for example by binary phase shift keying (BPSK), and are jointly received as a composite signal at the receiver. Each of the spread signals overlaps all of the other spread signals, as well as noise-related signals, in both frequency and time. If the receiver is authorized, then the composite signal is correlated with one of the unique signature sequences, and the corresponding information signal can be isolated and despread. If quadrature phase shift keying (QPSK) modulation is used, then the signature sequence may consist of complex numbers (having real and imaginary parts), where the real and imaginary parts are used to modulate two carriers at the same frequency, but ninety degrees different in phase.

Traditionally, a signature sequence is used to represent one bit of information. Receiving the transmitted sequence or its complement indicates whether the information bit is a +1 or −1, sometimes denoted "0" or "1". The signature sequence usually comprises N bits, and each bit of the signature sequence is called a "chip". The entire N-chip sequence, or its complement, is referred to as a transmitted symbol. The conventional receiver, e.g., a RAKE receiver, correlates the received signal with the complex conjugate of the known signature sequence to produce a correlation value. Only the real part of the correlation value is computed. When a large positive correlation results, a "0" is detected; when a large negative correlation results, a "1" is detected.

The "information bits" referred to above can also be coded bits, where the code used is a block or convolutional code. Also, the signature sequence can be much longer than a single transmitted symbol, in which case a subsequence of the signature sequence is used to spread the information bit. In many radio communication systems, the received signal includes two components: an I (in-phase) component and a Q (quadrature) component. This occurs because the transmitted signal has two components (e.g. QPSK), and/or the intervening channel or lack of coherent carrier reference causes the transmitted signal to be divided into I and Q components. In a typical receiver using digital signal processing, the received I and Q component signals are sampled and stored at least every $T_c$ seconds, where $T_c$ is the duration of a chip.

The conventional RAKE receiver performs well provided several conditions are satisfied. The first condition is that the autocorrelation function of the signature sequence is ideal, in that the signature sequence is uncorrelated with a shift of itself. If this is not true, then the different signal rays interfere with one another, which is referred to as self interference. The second condition is that the crosscorrelation between the signature sequence of the desired signal and various shifted versions of the signature sequences of the other CDMA signals is zero. If this is not true, then the other CDMA signals interfere with the desired CDMA signal, degrading performance. This can be particularly significant when another CDMA signal has a much higher power than the desired CDMA signal, commonly referred to as the "near-far" problem. The third condition is that the interference caused by an echo of one transmitted symbol overlapping with the next transmitted symbol should be negligible. If this is not true, then transmitted symbols interfere with past and future transmitted symbols, which is commonly referred to as intersymbol interference (ISI).

Ideal autocorrelation functions, however, are commercially impractical to achieve due to, for example, bandwidth limitations. Accordingly, some solution for dealing with self-interference is desirable to improve the performance of CDMA receivers.

SUMMARY

The present invention provides an efficient approach for estimating channel tap coefficients that eliminates the problem of self interference in CDMA systems. According to exemplary embodiments, elimination of self interference can be accomplished by decorrelating the correlation values with respect to one another. Decorrelation is performed, for example, by multiplying an inverse of a matrix including autocorrelation function values with the vector of received bits correlated with the signature sequence associated with that autocorrelation function. This decorrelation procedure can be performed, for example, before, after or within conventional channel tracking processes.

BRIEF DESCRIPTION OF THE DRAWINGS

The foregoing and other, objects, features and advantages of the present invention will be more readily understood upon reading the following detailed description in conjunction with the drawings in which:

FIG. 1 is a block diagram of an exemplary spread-spectrum communications link;

FIG. 2 is a block diagram of a conventional coherent RAKE detector;

DETAILED DESCRIPTION

Figure 3:
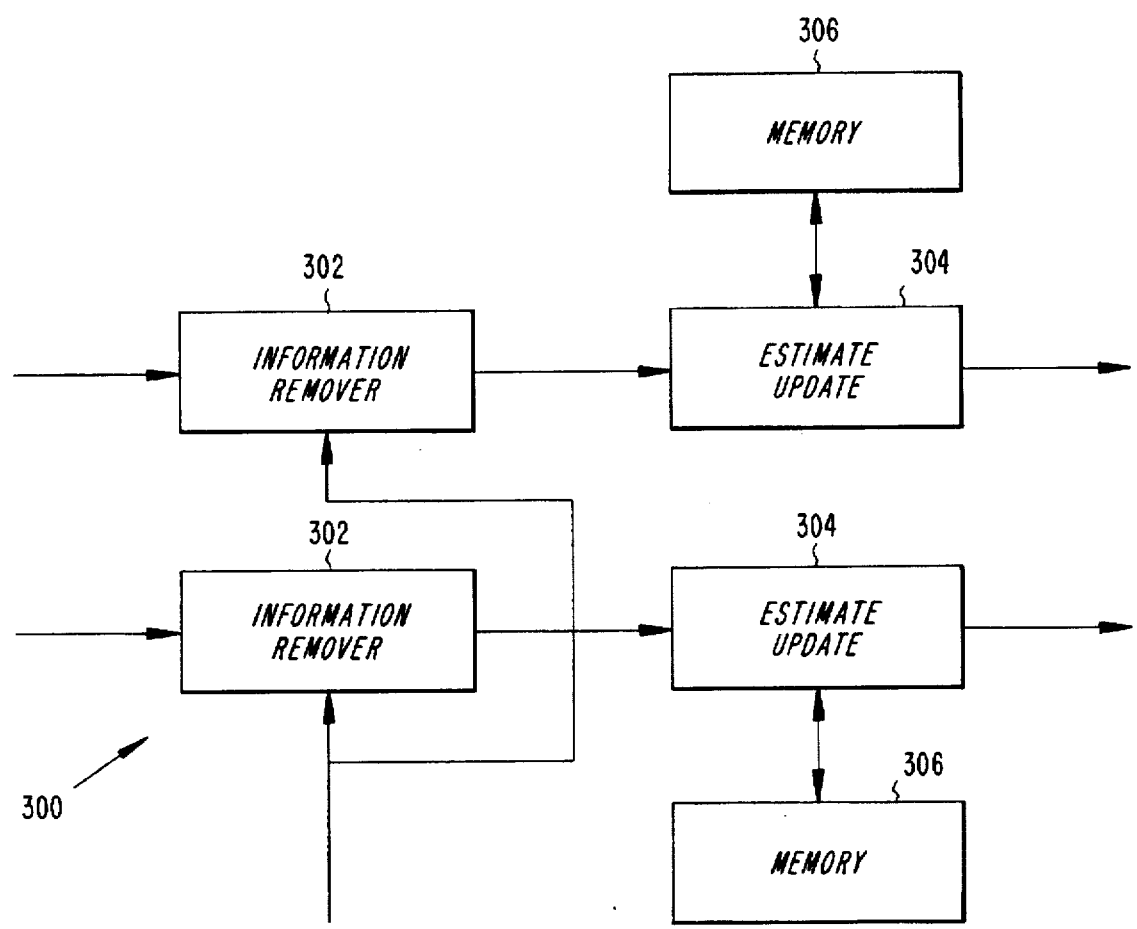
FIG. 3 is a block diagram of a conventional channel tracker.

An exemplary spread-spectrum communication link is shown in FIG. 1. First, in spreader 102, an informational data stream consisting of information symbols is impressed upon a much higher rate data stream known as a signature sequence to generate a spread or transmitted data sequence. It is common for the period of the signature sequence to occupy one data symbol period, so that each data symbol is spread by the same N-chip signature sequence. In general, this signature sequence may be represented by real and imaginary numbers, corresponding to sending a chip value on the carrier frequency (I channel) or on a 90-degree shifted version of the carrier frequency (Q channel). Also, the signature sequence may be a composite of multiple sequences, where one of these sequences may be a Walsh-Hadamard code word.

Information symbols can be M-ary, taking on one of M possible values. For example, for M=2, binary symbols are used, which can be represented as +1 and −1 values. Spreading information symbol b using signature sequence s(k), which consists of +1 and −1 chip values, gives the transmitted sequence t(k):

$$t(k)=b\ s(k) \qquad (1)$$

This spreading operation could also be determined using digital logic, with sequences of 0's and 1's and spreading by performing exclusive-OR operations. Other forms of spreading are possible. For example, a set of M bits can be spread by using the bits to select one set of N code words, where $N=2^M$. The set of code words could be an orthogonal set, such as the Walsh code word set.

The spread signal is then modulated onto a radio-frequency carrier in modulator 104. If the spread data symbols are binary, then binary phase-shift keying (BPSK) would be an appropriate modulation. The modulated signal is passed to antenna 106 for transmission using electromagnetic waves. At the receiver, receive antenna 108 collects signal energy and passes it to a radio receiver 110, which provides the necessary amplification, filtering, and mixing operations to convert the radio signal to a complex, baseband signal consisting of in-phase (I) and quadrature (Q) components as is well known in the art. These components are usually sampled once per chip period and may be stored in a buffer (not shown).

The received data samples are passed to a correlator 112, which correlates the received data samples to the known signature sequence. This process is sometimes referred to as de-spreading, since the correlation coherently combines the spread data values back into one informational value when the correlator is aligned with an image of the transmitted signal. The correlations are provided to a detector 114, which produces a detected informational data stream. The form of detector used depends on the characteristics of the radio channel and complexity limitations.

In wireless systems, the radio channel gives rise to multipath fading and multipath dispersion, because of signal reflections from buildings, cars, or nearby mountain ranges. As a result, the signal proceeds to the receiver along not one, but many paths, so that the receiver receives many echoes or rays having different and randomly varying delays and amplitudes. The received signal is then a composite of multiple versions of the transmitted signal that have propagated along different paths having relative time delays usually less than one informational symbol period. Each distinguishable ray has a certain time of arrival $kT_c$ seconds relative to the arrival of the first ray. If t(k) denotes the spread data chip samples and r(k) denotes the received chip samples, where k is the discrete time index, then multipath time dispersion can be modeled as:

$$r(k) = \sum_{j=0}^{J-1} c(j)s(k-j) + n(k) \quad (2)$$

where J is the number of rays or channel taps caused by the multipath dispersion, c(j) are complex-valued channel tap coefficients, and n(k) models impairments such as noise or interference. As a result of multipath time dispersion, the correlator 112 produces several de-spread values, one for each of the J channel taps.

One form of detector 114 designed to process such a radio channel is known as the RAKE detector. Such a detector combines the de-spread values coherently to maximize the detection statistic signal power. One form of the RAKE detector, designed for binary information symbols, is shown in FIG. 2. Therein, correlation values are passed through a tapped delay line 202. Note that in FIG. 2 (and many of the other Figures) although many signal lines will be present in a physical embodiment of such a receiver, only two signal lines are illustrated as outputs from the tapped delay line 202 to illustrate the described concepts without unduly complicating the Figure. When the earliest arriving ray correlation is at one end of the tapped delay line and the latest arriving ray correlation is at the other end of the tapped delay line, which occurs once per information symbol period, the values stored in the delay line are multiplied in multipliers 204 by RAKE tap coefficients, producing products which are summed in adder 206. The sign of the resulting sum is taken in 208, giving a detected information bit value, e.g., ±1.

Mathematically, suppose $r(k)=I(k)+iQ(k)$ are the complex received chip samples during a particular information symbol period, where I(k) are the I component samples, Q(k) are the Q component samples, i denotes the imaginary component, and k is the sample index (e.g., a discrete time index). The correlator 112 correlates these data samples to the known signature sequence, s(k), to produce:

$$x(m) = \sum_{k=0}^{N-1} s^*(k)r(k+m) \quad (3)$$

where the * superscript denotes complex conjugation, which is preferred if the signature sequence is complex.

The RAKE detector weights the correlations and sums the results to produce a detection statistic z for transmitted symbol b.

$$z = Re \left\{ \sum_{j=0}^{J-1} a^*(j)x(j) \right\} \quad (4)$$

where a(j) are the RAKE tap coefficients. Theoretically, the RAKE tap coefficients should be equal to the channel tap coefficients:

$$a(k)=c(k) \quad (5)$$

In practice, the RAKE tap coefficients are estimates of the channel tap coefficients, provided by channel tracker 116.

Coherent detectors other than the conventional RAKE detector are known. For example, joint demodulation could be used to jointly demodulate a plurality of communication signals, as described in U.S. Pat. No. 5,506,861 by Bottomley, which disclosure is incorporated here by reference.

In conventional forms of coherent detection, performance is limited by the accuracy of the channel tap coefficient estimates produced by the channel tracker. A conventional channel tracker 300 is illustrated in FIG. 3. Correlation values are provided to information removers 302, which adjust the correlation values based on the detected information. The adjusted correlations are provided to estimate update processors 304, which update the channel tap coefficient estimates stored in memories 306, producing updated channel tap coefficient estimates. One way of updating the estimates, for example, is to weight the previous estimate by $\lambda$ and add to it the adjusted correlation weighted by $(1-\lambda)$. Other forms of updating are possible, as is well known to those skilled in the art.

These conventional approaches give accurate channel estimates when the signature sequence has perfect autocorrelation properties. In practical commercial systems, with finite bandwidth constraints, the autocorrelation of the signature sequence with itself is not perfect, so that echoes or rays of the signal interfere with one another when channel estimation is performed.

This problem is illustrated by an example, in which there are two rays (i.e., J=2) and no impairment (i.e., n(k)=0). From equations (1) and (2), the received signal is given by:

$$r(k)=c(0)b\ s(k)+c(1)b\ s(k-d) \quad (6)$$

where d is the delay of the second ray relative to the first. At the receiver, the despread signal is obtained by correlating to the known signature sequence s(k) at the times rays are present. For the sake of illustration, assume the correlation is normalized by dividing by N, the length of the sequence. From equations (3) and (6), the correlations x(m) at m=0 and m=d are given by:

$$x(0)=b\ c(0)+b\ c(1)C_{s,s}(d) \quad (7)$$

$$x(d)=b\ c(0)C^*_{s,s}(-d)+b\ c(1) \quad (8)$$

where $C_{s,s}(d)$ is a normalized aperiodic autocorrelation function of the signature sequence s(k) at delay d. That is, $$C_{s,s}(d) = \frac{1}{N-2|d|} \sum_{k=|d|}^{N-1-|d|} s^*(k)s(k-d) \quad (9)$$

The information removers 302 effectively divide the correlations by the detected information symbol, $b_{det}$. Assuming no detection error, the adjusted values are given by:

$$x_a(0)=c(0)+c(1)C_{s,s}(d) \quad (10)$$

$$x_a(d)=c(0)C^*_{s,s}(-d)+c(1) \quad (11)$$

If the signature sequence has perfect autocorrelation properties, then $C_{s,s}(d)$ and $C^*_{s,s}(-d)$ would both be zero, and the adjusted correlation values would give instantaneous estimates of the channel tap coefficients. However, when $C_{s,s}(d)$ and $C^*_{s,s}(-d)$ are nonzero, then the adjusted correlation values are distorted by the presence of other signal rays. Using distorted channel tap estimates in the detector leads to a loss in performance. Thus, conventional channel tap coefficient estimation is degraded by inter-ray interference, which leads to a degradation in receiver performance.

According to exemplary embodiments of the present invention this interference problem can be solved by decorrelating the correlation values with respect to one other. As a result, inter-ray interference is mitigated.

The principle will first be discussed with respect to the two-ray example used previously. Expressions (7) and (8) can be viewed as a system of two equations in two unknowns, the unknowns being bc(0) and bc(1) (bc₀ and $bc_1$, respectively, in equation (12) below). Since the signature sequence is known at the receiver, its autocorrelation function is also known. Thus, equations (7) and (8) can be expressed as:

$$\begin{bmatrix} 1 & C_{s,s}(d) \\ C_{s,s}(-d) & 1 \end{bmatrix} \begin{bmatrix} b & c_0 \\ b & c_1 \end{bmatrix} = \begin{bmatrix} x(0) \\ s(d) \end{bmatrix} \quad (12)$$

which has the form Ax=y. The receiver has knowledge of A and y, thus it can solve for x, the channel tap coefficients. Observe that the unknowns do not contain inter-ray interference.

One way of solving this equation is to multiply both sides by the inverse, so that $x=A^{-1}y$. In this case, the y vector contains the measured correlation values, which contain inter-ray crosscorrelation terms. The matrix $A^{-1}$ effectively removes these inter-ray crosscorrelation terms, which can be viewed as "decorrelating" the correlation values from one another. This decorrelation should not be confused with the original correlation to the signature sequence, as one does not want to undo the despreading. In practice, while $C_{s,s}(d)$ are nonzero, they are usually not too large, so that $A^{-1}$ is well defined.

Variations on this concept will be apparent to those skilled in the art. For example, when impairment is present, i.e., $n(k) \neq 0$, it may be desirable to add noise power estimates to the diagonal of the A matrix. If noise power estimates are unavailable, a nominal noise value can be added, based on standard or limiting operating conditions for the receiver. Moreover, the decorrelation approach is easily extended to an arbitrary number of rays corresponding to arbitrary delay times. For J rays, the vector y consists of J correlations, and the matrix A has J rows and J columns. Finally, other definitions of correlation can be employed, such as periodic correlation.

Figure 4:
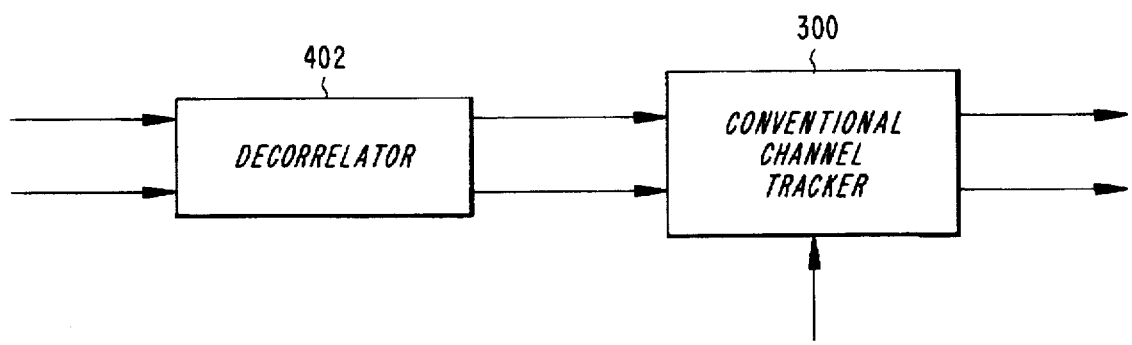
FIG. 4 is a block diagram of an exemplary embodiment of a channel tracker according to the present invention.

The present invention will now be described with respect to FIG. 4, which illustrates a channel tracker according to an exemplary embodiment of the present invention which can replace the channel tracker 116 shown in FIG. 1. Therein, correlation values are provided to decorrelator 402, which decorrelates the correlation values so that inter-ray interference is removed. The decorrelated values are then passed to, for example, a conventional channel tracker 300, which treats the decorrelated values as if they were correlation values according to FIG. 3. Thus, the step of decorrelation has been inserted into the channel tracking process.

Figure 5:
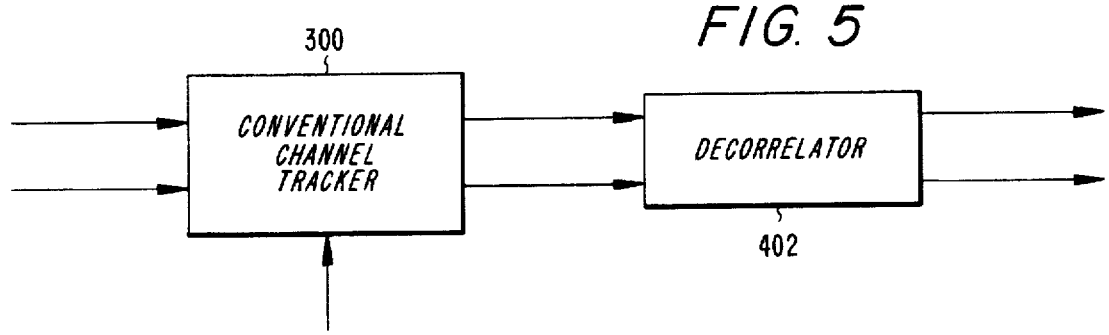
FIG. 5 is a block diagram depicting another exemplary embodiment of a channel tracker according to the present invention.
Figure 6:
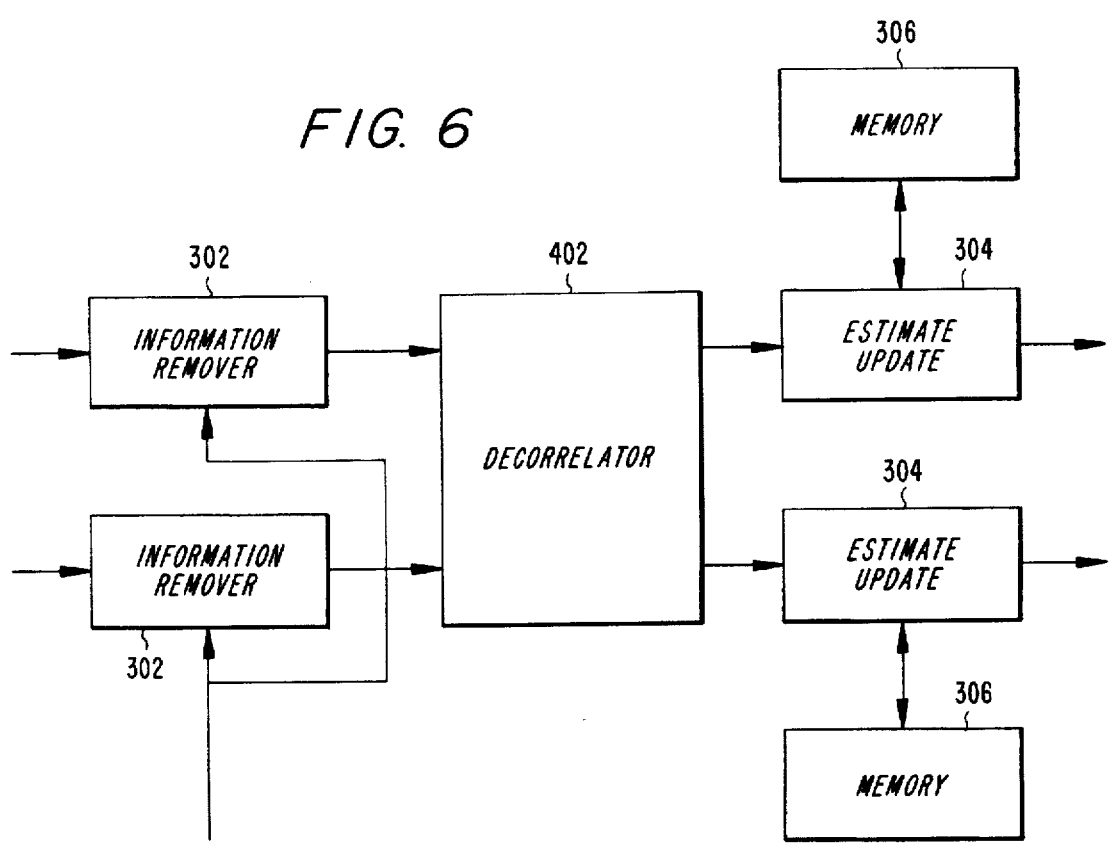
FIG. 6 is a block diagram of yet another exemplary embodiment of a channel tracker according to the present invention.
Figure 7:
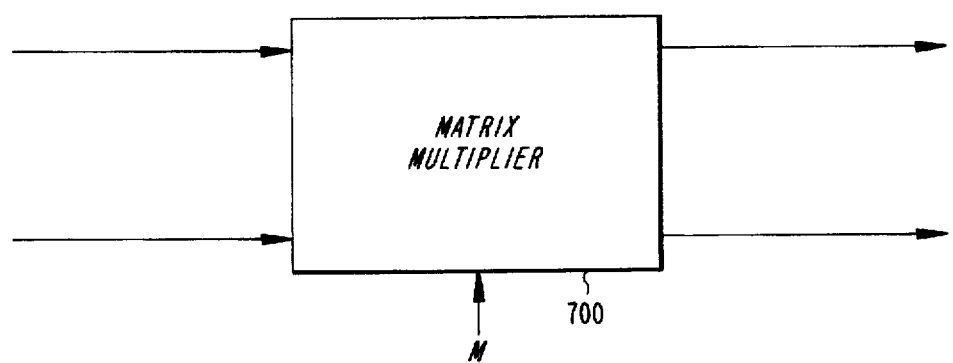
FIG. 7 is a block diagram illustrating an exemplary decorrelator according to the present invention.

The decorrelation operation does not have to be performed before conventional channel tracking. An alternative embodiment is shown in FIG. 5, in which the decorrelator 402 follows the conventional tracker 300. A third alternative is shown in FIG. 6, in which the decorrelation operation 402 occurs within the conventional channel tracker, just after the information removal. The decorrelation operation can be implemented in a variety of ways. An exemplary embodiment is given in FIG. 7 for purposes of illustration rather than limitation. The decorrelator 402 effectively solves the system Ax=y for x. One way of doing this is by multiplying the vector y by $A^{-1}$, which is a matrix multiply operation. In FIG. 7, this is implemented by a matrix multiplier 700. The matrix multiply would be provided with the correlation values x and the matrix M, and form the product Mx. The matrix M would be $A^{-1}$, which could be pre-computed and stored for various channel tap locations and signature sequences. Other methods for solving Ax=y are possible, including Gaussian elimination, and all such techniques are contemplated by the present invention.

In some applications, it may be desirable to shorten the correlations used by the channel tracker, so that interference between information symbol periods is not introduced. For example, if d=1, then the despreading correlation may only correlate to the partial sequence s(1) through s(N−2), rather than the full sequence s(0) through s(N−1).

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What I claim is:

1. In a spread-spectrum wireless communications system for communicating a sequence of information symbols, a receiver comprising:

means for receiving a signal using an antenna;

means for processing said received signal to produce correlations between the received signal and a known signature sequence;

means for decorrelating said correlations to remove inter-correlation interference to produce decorrelated values;

means for estimating channel tap coefficients using said decorrelated values; and means for detecting said information symbols using said correlations and said channel tap coefficient estimates.

2. The receiver of claim 1, wherein said means for decorrelating further comprises:

a matrix multiplier which multiplies a matrix including values related to autocorrelation function values with a vector including said correlations.

3. In a spread-spectrum communications receiver that produces correlations of received data with a known signature sequence, a channel tracker comprising:

means for decorrelating said correlations to produce decorrelated values; and means for processing said decorrelated values to produce channel tap coefficient estimates.

4. The receiver of claim 3, wherein said means for decorrelating further comprises:

a matrix multiplier which multiplies a matrix including values related to autocorrelation function values with a vector including said correlations.

5. A receiver comprising:

a correlator for receiving data and correlating said received data with a signature sequence to produce correlations;

a channel estimation unit for providing channel tap coefficient estimates based upon said correlations;

a decorrelator which decorrelates said channel tap coefficient estimates; and a detector which combines said correlations using said decorrelated channel tap estimates.

6. A method for processing received spread spectrum communication signals comprising the steps of:

correlating received data with a signature sequence to produce correlations;

generating tap coefficient estimates based upon said correlations;

combining said correlations to determine information symbols using said tap coefficient estimates; and decorrelating prior to combining to reduce inter-ray interference.

7. The method of claim 6, wherein said step of decorrelating further comprises the step of:

decorrelating said correlations prior to generating said tap coefficient estimates to generate decorrelated values and using said decorrelated values to generate said tap coefficient estimates.

8. The method of claim 6, wherein said step of decorrelating further comprises the step of:

decorrelating correlations as part of said step of generating said channel tap coefficient estimates.

9. The method of claim 6, wherein said step of decorrelating further comprises the step of:

decorrelating said channel tap coefficients after said step of generating said channel tap coefficients.

* * * * *